(12) United States Patent
Barhudarian et al.

(10) Patent No.: US 11,627,138 B2
(45) Date of Patent: Apr. 11, 2023

(54) CLIENT READINESS SYSTEM

(71) Applicant: MICROSOFT TECHNOLOGY LICENSING, LLC, Redmond, WA (US)

(72) Inventors: Violet Anna Barhudarian, Kirkland, WA (US); Jiangfeng Lu, Bothell, WA (US); Caleb Geoffrey Baker, Seattle, WA (US); Oren Jordan Melzer, Redmond, WA (US); Anirban Basu, Sammamish, WA (US); Yordan Ivanov Rouskov, Seattle, WA (US); William Bruce Barr, III, Issaquah, WA (US); Radhika Kashyap, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 273 days.

(21) Appl. No.: 16/670,878

(22) Filed: Oct. 31, 2019

(65) Prior Publication Data
US 2021/0136078 A1 May 6, 2021

(51) Int. Cl.
*H04L 29/06* (2006.01)
*H04L 9/40* (2022.01)
(Continued)

(52) U.S. Cl.
CPC ......... *H04L 63/102* (2013.01); *G06Q 10/063* (2013.01); *H04L 9/3213* (2013.01); *H04L 63/08* (2013.01)

(58) Field of Classification Search
CPC ..... H04L 63/102; H04L 9/3213; H04L 63/08; G06Q 10/63
See application file for complete search history.

(56) References Cited

U.S. PATENT DOCUMENTS

| 11,177,967 | B2* | 11/2021 | Pala ..................... H04L 9/3242 |
| 2004/0128541 | A1* | 7/2004 | Blakley, III ........ H04L 63/0815 726/9 |

(Continued)

OTHER PUBLICATIONS

"International Search Report and Written Opinion Issued in PCT Application No. PCT/US20/056956", dated Feb. 3, 2021, 10 Pages. (MS# 407549-WO-PCT).

*Primary Examiner* — Tongoc Tran
(74) *Attorney, Agent, or Firm* — Workman Nydegger

(57) ABSTRACT

A computing system configured to support entities having the ability to indicate capability information for capabilities of the entities is illustrated. Embodiments may include an identity provider computer system comprising at least one processor. The identity provider computer system is configured to receive requests for access tokens from entities. The requests include capability information for the entities. The identity provider computer system is further configured to provide access tokens to the entities which include the capability information. The computing system further includes a resource provider computer system comprising at least one processor configured to receive resource requests and access tokens from entities. The access tokens include the capability information. The resource providers are further configured to provide responses to the entities according to the capability information.

17 Claims, 10 Drawing Sheets

(51) Int. Cl.
  *G06Q 10/063* (2023.01)
  *H04L 9/32* (2006.01)

(56) References Cited

U.S. PATENT DOCUMENTS

| | | | |
|---|---|---|---|
| 2005/0091495 A1* | 4/2005 | Cameron | H04L 63/102 |
| | | | 713/175 |
| 2006/0129817 A1* | 6/2006 | Borneman | H04L 63/0815 |
| | | | 713/170 |
| 2007/0199059 A1* | 8/2007 | Takehi | G06F 21/31 |
| | | | 726/10 |
| 2007/0204168 A1* | 8/2007 | Cameron | G06F 21/33 |
| | | | 713/185 |
| 2007/0255958 A1* | 11/2007 | Schmidt | G06F 21/335 |
| | | | 713/183 |
| 2008/0010287 A1* | 1/2008 | Hinton | G06F 16/2471 |
| 2008/0010665 A1* | 1/2008 | Hinton | G06F 21/41 |
| | | | 726/1 |
| 2008/0046984 A1* | 2/2008 | Bohmer | H04L 63/0853 |
| | | | 726/5 |
| 2009/0307744 A1 | 12/2009 | Nanda et al. | |
| 2015/0039444 A1* | 2/2015 | Hardin | H04L 67/02 |
| | | | 705/14.69 |
| 2015/0121470 A1* | 4/2015 | Rongo | H04L 12/2807 |
| | | | 726/4 |
| 2015/0143471 A1* | 5/2015 | Kim | H04W 12/069 |
| | | | 726/4 |
| 2016/0044719 A1* | 2/2016 | Sidhu | H04W 76/11 |
| | | | 370/329 |
| 2017/0054712 A1 | 2/2017 | Wetter et al. | |
| 2017/0279620 A1* | 9/2017 | Kravitz | H04L 9/3268 |
| 2019/0268328 A1 | 8/2019 | Hussein et al. | |
| 2021/0075791 A1* | 3/2021 | Dunjic | H04W 12/06 |

\* cited by examiner

CLIENT READINESS SYSTEM

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

For example, an entity may be configured to access resources from a resource provider where the resource provider is a remote computing system. To obtain access to these resources, the entity will typically authenticate with an identity provider to receive an access token and a refresh token, where the access token can be presented to the resource provider in a request for resources. If the access token is valid, an authenticated user session is created between the resource provider and the entity for the resource provider to provide the resources.

In particular, IT administrative policies for an organization are often configured centrally on an identity provider, which authenticates entities and provides credentials used by entities in the organization. The policies are then enforced by the identity provider when issuing authentication artifacts (e.g., access tokens) that are used to confirm a user's identity. Before issuing an access token to the user, the identity provider evaluates administrative policies to ensure a user's compliance. The access token is then passed, by the entity, to a resource provider that grants resource access based on the information in the access token.

Entities may have need to provide additional information to identity providers or resource providers. However, efficient ways to accomplish this may not currently be available.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a computing system configured to support entities having the ability to indicate capability information for capabilities of the entities. Embodiments may include an identity provider computer system comprising at least one processor. The identity provider computer system is configured to receive requests for access tokens from entities. The requests include capability information for the entities. The identity provider computer system is further configured to provide access tokens to the entities which include the capability information. The computing system further includes a resource provider computer system comprising at least one processor configured to receive resource requests and access tokens from entities. The access tokens include the capability information. The resource providers are further configured to provide responses to the entities according to the capability information.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

The application is generally directed to an organization client that is able to communicate client capabilities to identity providers and resource providers in a system, such as an enterprise system. For example, in some embodiments illustrated herein, entities can implement a client that is able to communicate to entity providers and resource providers that it has the ability to perform special functionality with regard to rejection of access tokens for reasons other than expiration of the tokens. Alternatively or additionally, embodiments may include functionality for allowing clients to communicate other information to servers, such as resource provider servers, discussed in more detail herein.

Consider the following example, an entity, including a client, will exchange authentication protocol messages with an identity provider. The client will provide information to the identity provider indicating that the client has certain capabilities. In the token that is issued to the entity, information will be included identifying those capabilities. The client can provide the token, including the information identifying the capabilities, to the resource provider to access resources administered by the resource provider. In this way, the client can inform both the identity provider and the resource provider of capabilities of the entity.

This could be used for the client to inform the identity provider or the resource provider of virtually any capabilities held by the entity. For example, embodiments may include the ability to inform the identity provider or the resource provider of an ability to communicate using a specialized token rejection protocol indicating that the entity is capable of handling the rejection of tokens, even when that rejection is related to factors other than a timeout of the token. For example, this functionality may be used when tokens are rejected due to changes to overall policy, detected changes to a client, rejections based on conditional policy evaluation at a resource provider, rejections based on changes to an overall computing environment, etc.

Alternatively, or additionally, the entity may be able to identify capabilities of the entity to the identity provider with respect to processing capabilities available at the entity. For example, the entity could indicate to the identity provider that the entity is only capable of handling videos encoded according to a particular codec. By indicating this information to the identity provider, the identity provider can create a token with this information embedded in the token, which is then provided to the entity. When the entity presents this particular token to the resource provider, the resource provider will provide compliant resources. E.g., in the particular example illustrated, the resource provider will only provide videos encoded according to the codec specified in the token issued based on the information provided from the entity to the identity provider.

Figure 1:
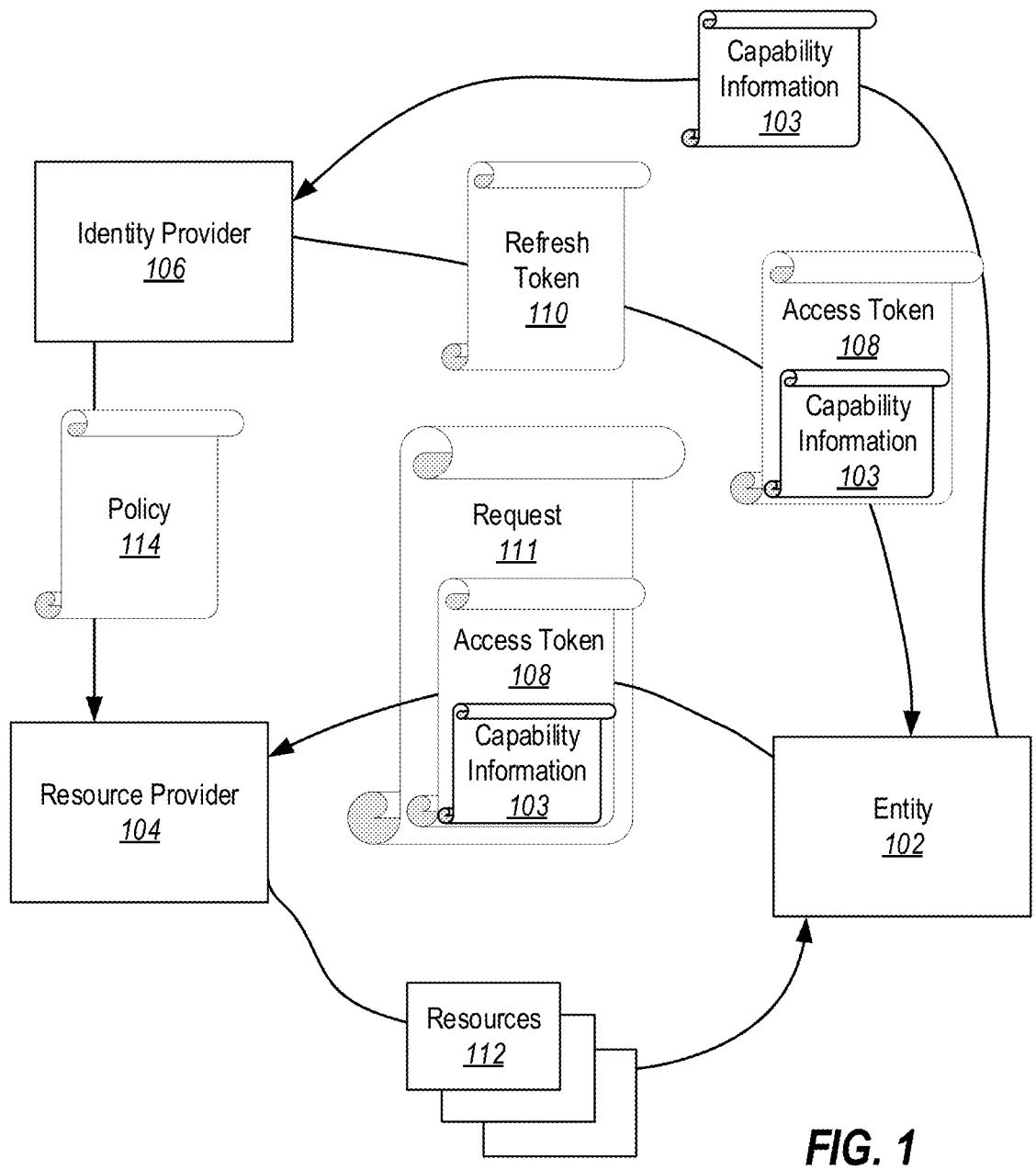
FIG. 1 illustrates a system for providing enterprise policy to resource providers to allow resource providers to enforce the policy.

Referring now to FIG. 1, an example is illustrated. FIG. 1 illustrates an entity 102. In the illustrated example, the entity 102 may include a user as well, a device, and one or more associated clients (e.g., applications) used by the user. Note that the user is not necessarily a human user. The entity 102 may have need to access resources from a resource provider 104. The resource provider 104 is a computer system configured to administer computing resources to users. The resources may be stored at the resource provider 104, or may be obtained by the resource provider from other sources.

To obtain access to the resources, the entity 102 will first authenticate with an identity provider 106. The identity provider 106 is a computing system configured to administer policy and to issue cryptographic tokens to entities to allow the entities to access resources from resource providers. The entity 102 can authenticate to the identity provider 106 through any one of a number of different well-known authentication and access token issuance schemes, other less well-known authentication schemes, or even future authentication schemes yet to be developed. Suffice it to say, in the particular example shown in FIG. 1, the entity 102 receives from the identity provider 106 an access token 108 and a refresh token 110.

The access token 108 typically includes a timestamp indicating when the access token was issued. The access token 108 may alternatively or additionally include information indicating when the access token 108 expires. In some embodiments, the access token 108 may include information about authentication procedures used by the entity 102 to authenticate to the identity provider 106. For example, the access token 108 may indicate that the access token 108 was obtained by the entity 102 authenticating to the identity provider using a simple user identity and secret authentication protocol. One such common protocol is the password authentication protocol, where the identity is a username and the secret is a password. Alternatively or additionally, if the entity 102 is authenticated to the identity provider 106 using double factor authentication, this can be indicated in the access token 108. Alternatively or additionally, if the entity 102 authenticated to the identity provider using a certain strength of password, this sort of information can be indicated in the access token 108 itself. For example, the access token may indicate the minimum length of password used to authenticate to the identity provider, use of special characters in the password used to authenticate to the identity provider, use of both upper and lowercase letters in the password used to authenticate to the identity provider, absence of common passwords or other words in the password used to authenticate to the identity provider, etc.

In some embodiments, the access token 108 will be for a particular user as well as for a client used by the particular user. Thus, in this example, the entity 102 includes both the user and the client used by the user. For example, the user may use a laptop computer with a corresponding laptop computer client to perform the authentication and resource requests. Thus, the access token 108 may include information about the laptop computer client of the entity 102. Alternatively, the user may use a smart phone to perform the authentication, in which case a corresponding smart phone client is used to perform the authentication and to perform resource requests, meaning that the access token 108 will be for an entity 102 including a user using a smart phone client.

Returning once again to the example illustrated in FIG. 1, the entity 102 can provide the access token 108 to the resource provider 104 in a request for resources from the resource provider 104. The resource provider 104 can evaluate the access token to determine that the entity 102 has been properly authenticated to the identity provider 106 and that the access token 108 is otherwise valid. In particular, the access token 108 may have an expiration and the resource provider 104 can determine that the access token 108 has not expired. Ordinarily, so long as this evaluation of the access token 108 passes the various checks, then the resources 112 will be provided to the entity 102. However, embodiments illustrated herein can implement additional checks with respect to the request 111 by the entity 102 to the resource provider 104.

For example, FIG. 1 illustrates that the resource provider 104 can receive policy 114 from the identity provider 106. This allows the resource provider 104 to administer the policy on behalf of the identity provider 106.

FIG. 1 further illustrates that the entity 102 can provide capability information 103 to the identity provider 106 during an authentication procedure. As illustrated in FIG. 1, this capability information 103 can be embedded in an access token 108 provided by the identity provider 106 to the entity 102. In some embodiments, the capability information 103 and the policy 114 are tied and correlated. That is, the policy 114 may be specific to the capability information 103. Thus, for example, specific policy 114 may be generated, sent, or combinations thereof depending on what is in the capability information 103. For example, the capability information 103 may indicated that the entity 102 is capable of performing complex computations. Policy 114 may be generated and provided to the resource provider 104 that requires the entity 102 to perform a complex computation prior to being provided resources 112.

When the entity 102 requests resources 112 in a request 111 from the resource provider 104, the entity 102 will include the access token 108 in the request 111 or as part of the request procedure. The access token 108 includes the capability information 103 passed to the resource provider 104. In this way, the resource provider 104 is made aware of certain capabilities of the entity 102 as set forth in the capability information 103.

As noted previously, this capability information 103 may include one or more of a number of different types of information.

In one particular embodiment, the capability information 103 indicates to the identity provider 106 that the entity 102 is capable of dealing with certain token rejection conditions. As discussed previously, token rejection by the resource provider 104 in previous systems occurred due to the access token 108 having expired. However, the entity 102 can communicate capability information 103 that indicates that the entity is capable of dealing with rejections by the resource provider 104 of the access token 108 for other reasons. For example, the access token 108 may be rejected due to changes in the policy 114 provided by the identity provider 106 to the resource provider 104. Alternatively or additionally, the resource provider 104 may receive updated policy from other locations, such as a centralized publication service that publishes policy to the resource provider 104. The resource provider 104 may be configured to administer policy with respect to changes in an overall computing environment. For example, if a determination is made that nefarious attacks have increased in a computing environment, the resource provider 104 may require the entity 102 to have a certain level of authentication used when obtaining the access token 108. If the access token 108 does not comply with these requirements, the resource provider 104 may reject the access token 108, causing a user session between the entity 102 and the resource provider 104 to be terminated. In some embodiments, changes may be to user state, client state, policy state, conditional access conditions, behavior patterns, etc. The capability information 103 may indicate that the entity 102 is capable of handling token rejections for any of these reasons. In particular, such token handling may be more efficient than previous token handling. In particular, the entity 102 can reauthenticate to an identity provider when a user session is rejected for these reasons. In previous systems, the entity would have continued to try to access the resources using the cached access token, so long as the access token had not expired. However, embodiments herein do not need to wait of the token to expire, but rather can immediately end the session, prior to token expiration, and attempt to reauthenticate to the identity provider 106.

Figure 2:
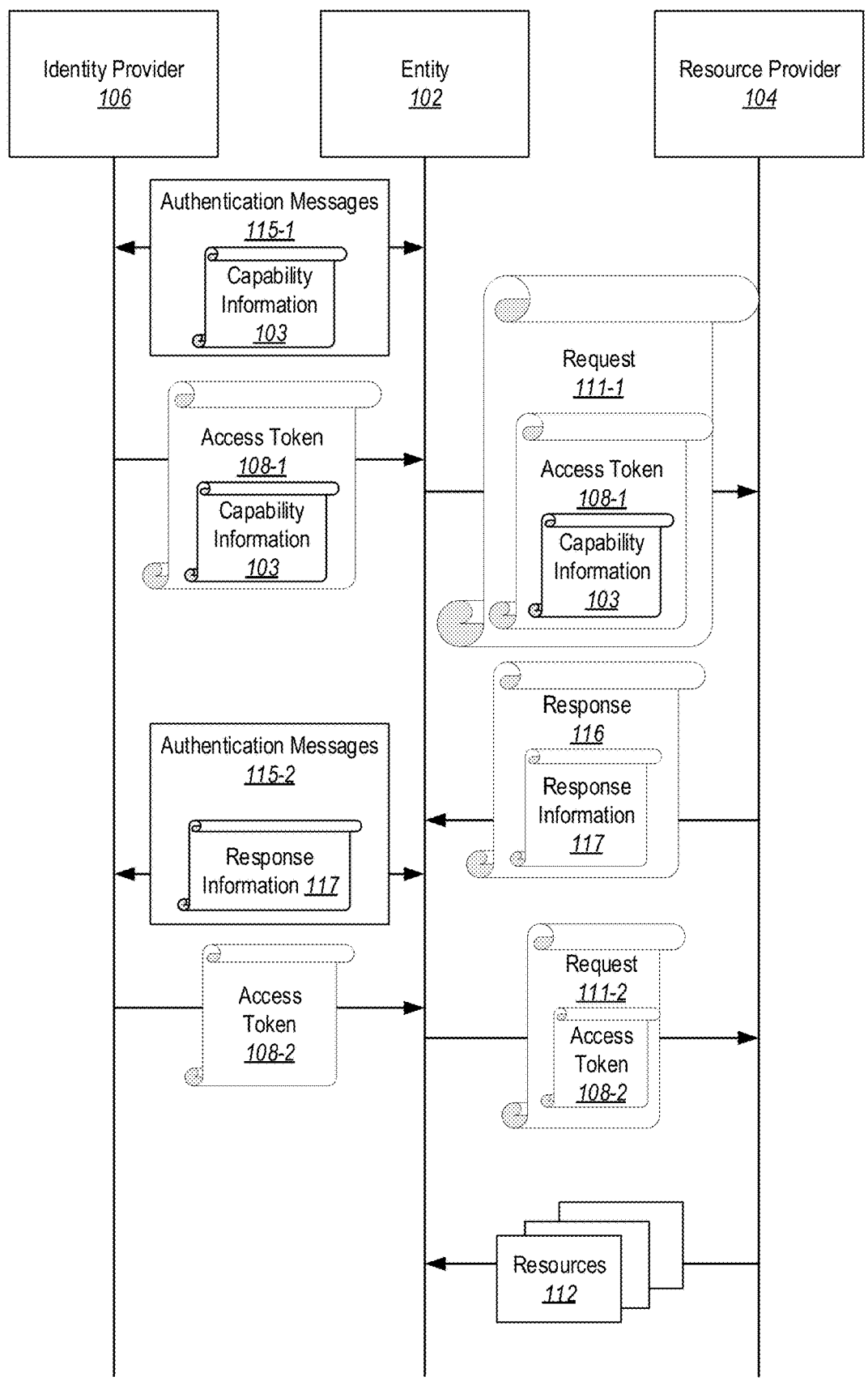
FIG. 2 illustrates communication flow between an identity provider, entity, and resource provider.

Referring now to FIG. 2, a more detailed example is illustrated. In the example illustrated in FIG. 2, the identity provider 106, entity 102, and resource provider 104 are illustrated. At a first time, the identity provider 106 and the entity 102 participate in an authentication protocol by exchanging authentication protocol messages 115-1. As part of this exchange, the capability information 103 is provided from the entity 102 to the identity provider 106. The exchange of authentication messages 115-1 results in the access token 108-1 being issued by the identity provider 106 to the entity 102. In this example, the access token 108-1 includes the capability information 103.

At a subsequent time, the access token 108-1 is used in a request 111-1 to request resources 112 in a request 111-1. The resource provider 104 may determine that the resources 112 cannot be provided for some reason. For example, as illustrated previously, the access token 108-1 may not have been obtained using a sufficiently strong authentication method for the type of resources requested by the entity 102. As a result of having received the capability information 103 in the access token 108-1, the resource provider 104 can determine that the entity 102 is capable of handling enhanced token rejections. As a result, the resource provider 104 can reject the token 108-1 in accordance with the capabilities indicated in the capability information 103. For example, the resource provider 104 can issue the response 116 which includes response information 117 indicating the reason why a user session cannot be created between the resource provider 104 and the entity 102. For example, as illustrated above, the response information 117 may indicate that the entity 102 is not using a token 108-1 having been obtained using a sufficient authentication method.

In some embodiments, this response 116 along with the response information 117 may be provided from the resource provider 104 to the entity 102 by virtue of the fact that the resource provider 104 is aware that the entity 102 is capable of dealing with such a response. In particular, the capability information 103 having previously been provided to the resource provider 104 allows the resource provider 104 to know of the capabilities of the entity 102. For example, if the entity 102 did not have the ability to handle the response information 117, then the resource provider 104 might be required to reject the access token 108-1 multiple times until the access token 108-1 had expired. In particular, in previous systems, the entity 102 would generally retry requests using the same token if the access token had not expired even if the access token was rejected for reasons other than expiration of the token. However, embodiments illustrated here in include entities that are capable of dealing with token rejections for reasons other than expiration of the token. If an entity 102 is capable of dealing with such a rejection, then the resource provider 104 can include additional information about the rejection which allows a more efficient resource request process as the user session is able to be invalidated and revalidated more quickly than in previous systems. In particular, rather than the entity 102 retrying requests until the access token 108-1 has expired, the entity 102 can identify that even though the access token 108-1 has not expired, it is invalid or unusable for other reasons.

Thus, in some embodiments, the entity 102 is able to access and read the response information 117 in the response 116. That is, the entity 102 may be made aware of the reason that a user session is being rejected by the resource provider 104 in spite of the entity 102 presenting a valid access token 108-1 to the resource provider 104. This can allow the entity 102 to respond by whatever programmatic means are implemented at the entity 102 for such situations.

Note that although FIG. 2 illustrates that the response information 117 is provided in a response 116 to a request for resources 112, the response information 117 may be provided during an existing user session if certain conditions have been met or the resource provider otherwise determines that the response information 117 should be provided to the identity provider 106 through the entity 102.

Ultimately, the response information 117 is passed to the identity provider 106 thus communicating information from the resource provider 104 to the identity provider 106 for a particular user session, even if that user session is an invalid user session that was never fully established or was established and later invalidated.

As illustrated in FIG. 2, in some embodiments the response information 117 is passed by the entity 102 to the identity provider 104 as part of a new set of authentication protocol messages 115-2. The identity provider 106 will use the response information 117 to create a new access token 108-2. The new access token 108-2 is then provided to the entity 102 as a result of the authentication protocol messages 115-2 and in view of the response information 117.

The entity 102 can send a request 111-2 along with the access token 108-2 to the resource provider 104. The resource provider 104 can evaluate the token 108-2 and determine that the token 108-2 is sufficient (e.g., was obtained using multifactor authentication) for obtaining the resources 112. Thus, as a result, the resource provider 104 can provide the resources 112 to the entity 102.

Thus, in some embodiments a resource provider 104 will need to provide information to an identity provider 106 including a reason that certain actions were taken. For example, a resource provider 104 may require some specific level of authentication in general, or for access to certain resources. For example, an entity 102 may request access to information that requires a higher level of authentication than for other information. Thus, embodiments herein may use the modalities illustrated to communicate such response information 117, or other information from the resource provider 104 to the identity provider 106.

In one example, the resource provider 104 may indicate to the entity 102 certain response information 117. For example, the resource provider 104 can indicate to the entity 102 that higher levels of authentication are required to access certain resources being requested by the entity 102. In this example, the entity 102 can use the response information 117 provided by the resource provider 104 to indicate to the identity provider 106 that certain things are required from the identity provider 106. For example, the entity 102 can indicate to the identity provider 106 that multifactor authentication is required for the entity 102 to be able to access certain resources at the resource provider 104. The identity provider 106 can then authenticate the entity 102 using a multifactor authentication protocol to provide the entity 102 with a token 108-2 that is issued as a result of the multifactor authentication protocol.

In some embodiments, the entity 102 will not consume information passed by the resource provider 104 to the entity 102. Rather the entity 102 will simply pass that information to the identity provider 106 and the identity provider 106 can proceed accordingly. However, the capability information 103 may nonetheless communicate the ability to perform this pass-through messaging whereby the entity 102 is capable of passing such information. Thus, for example, the entity 102 may not be made aware in some embodiments that higher levels of authentication are needed. Rather, the resource provider 104 will simply indicate to the entity 102 that it is unable to provide the resources requested by the entity 102. Additionally, it will provide a message to the entity 102 that is intended to be passed to the identity provider 106 where that message includes the response information 117 that indicates that a higher level of authentication is needed. In some embodiments, the resource provider 104 may simply terminate the user session with the user and direct the user back to the identity provider 106 along with a message including the response information 117 conveyed by the entity 102 from the resource provider 104 to the identity provider 106 that higher levels of authentication or other requirements are needed from the identity provider 106. The identity provider 106 can then respond accordingly to authenticate the entity 102 according to the response information 117 provided by the resource provider 104 to allow the entity 102 to access resources at the resource provider 104 using a token issued by the identity provider 106.

However, it should be appreciated, that in some embodiments the entity 102 can consume response information 117 provided by the resource provider 104 to the entity 102. For example, in addition to passing the response information 117 back to the identity provider 106, the entity 102 may include programmatic functions for performing certain actions as a result of receiving the response information 117. In some embodiments, the capability information 103 will so indicate that the entity 103 is capable of consuming such information.

Typically, an identity provider 106, that manages enterprise wide policy and enforces that policy by authenticating entities and making decisions about whether or not to issue access tokens to entities, and a resource provider 104 do not have a communication channel to communicate with each other on a user session basis for each user session initiated for an entity. However, the embodiments illustrated herein allow this communication to occur for each user session. In particular, the resource provider 104 can provide response information 117 to the identity provider 106 for a user session, and the identity provider 106 can provide information to the resource provider 104 through information included in a token 108 issued to the entity 102. In this way, user session information, in the form of the response information 114, can be provided from the resource provider 104 to the identity provider 106, and vice versa. Thus, embodiments can address issues related to the nonexistence of a direct link from a resource provider 104 to an identity provider 106 for a particular user session.

Figure 3:
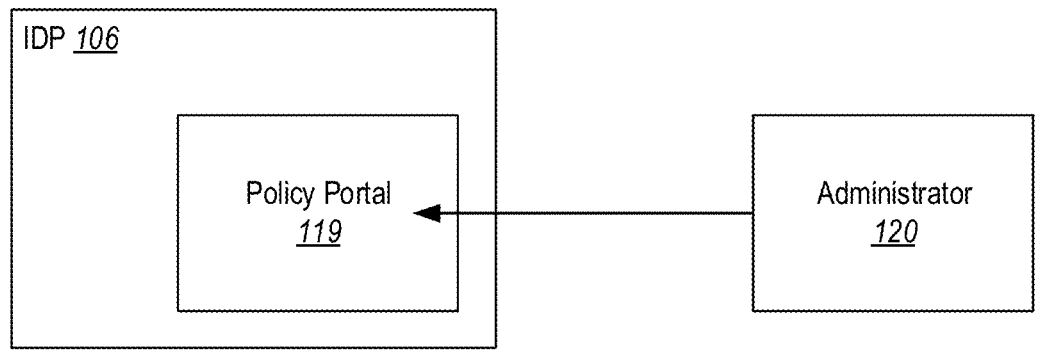
FIG. 3 illustrates a policy portal and an identity provider, and an administrator interacting with the policy portal to set policy for the enterprise.

Referring now to FIG. 3, additional details are illustrated. FIG. 3 illustrates that the identity provider 106 includes a policy portal 118. The policy portal 118 includes various user interfaces that can be accessed by an administrator 120 to allow the administrator 120 to configure policy for distributing resources within a system. Referring once again to FIG. 1, if the policy is better administered by the resource provider 104, then the policy 114 can be provided to the resource provider 104 and administered by the resource provider 104 to control how resources 112 are provided to the entity 102 according to the policy 114. Referring once again to FIG. 3, in some embodiments, the administrator can identify policies by selecting certain options displayed in the policy portal 118 indicating that a policy should be administered by the resource provider 104. In some embodiments, the administrator 120 can identify certain conditions, time periods, etc. when the policy should be provided to the resource provider 104 in the policy portal 118.

Some embodiments may have a location based policy that needs to be enforced. For example, an enterprise may have a need to implement a different level of protection when users attempt to access resources from inside of a trusted network as compared to an attempt to access resources from un-trusted network. For example, the trusted network is the normal corporate intranet used by the enterprise, and thus greater levels of security and lower levels of risk can be assumed. Thus, an enterprise may wish to allow access to certain resources when an entity attempts to access those resources from the corporate intranet. For the same resources, when an entity attempts to access the resources from outside of the corporate intranet, the entities may be blocked.

Alternatively, it may be desirable to obtain additional authentication to allow access the same resources outside of the corporate intranet. For example, some embodiments may require multi-factor authentication if an entity 102 attempts to access the resources 112 on a system that is outside of the corporate intranet. To accomplish this, the policy 114 is implemented at the resource provider. For example, the resource provider 104 can determine if the access token 108 was issued using multifactor authentication and if the entity 102 is attempting to access the resources 112 outside of the corporate intranet. If the entity 102 attempts to access the resources 112 from outside of the corporate intranet using an access token 108 issued using single factor authentication, then the resource provider 104 can invalidate the user session and cause the entity 102 to re-authenticate to the identity provider 106 to obtain an access token issued using multifactor authentication.

Note that by having the identity provider 106 provide the policy 114 to the resource provider 104, it should be appreciated that the identity provider 106 can provide the policy 114 to any resource provider to which the policy 114 is relevant. This creates a scalable system that is able to quickly and efficiently distribute policy to resource providers as needed. This eliminates the need to manually configure the various resource providers as well as the applications running on those resource providers or on the entities attempting to access resources from the resource providers. This allows the system to scale efficiently.

In particular, administrators simply need to configure the policy in an identity provider portal.

Additionally, if administrators attempt to configure certain policies, such as multifactor authentication, at the resource provider, they are unable to do so because the resource provider does not support certain functionality and understanding related to multifactor authentication itself or other types of authentication. Resource providers are limited to providing access or blocking access.

By configuring the policy with the identity provider, greater granularity can be achieved in policy enforcement. For example, different authentication methods may be able to be configured. Additionally, the use of the identity provider for receiving administrator input for configuring policy allows the administrator to globally administer policy in one central location.

Thus, embodiments herein are able to address this situation by allowing the resource provider to download policy from the identity provider. Stated differently, the identity provider can share administrator configured policy with the resource provider. At this point, the resource provider has the policy and can directly enforce the policy on the user when the user attempts to access resources at the resource provider.

For example, in some embodiments as described above, a resource provider can determine whether a user is attempting to access resources from a trusted location or from an un-trusted location. If the user is attempting to access the resources from an un-trusted location, the resource provider can directly apply policy related to un-trusted location attempts to access resources. For example, if a user attempts to access resources from an un-trusted location using an access token that was obtained in a fashion that is not compliant for un-trusted location access (e.g., the token was obtained using single factor authentication), then the resource provider can terminate the user session, thus invalidating the token and direct the user back to the identity provider to obtain appropriate credentials (e.g., using multi-factor authentication to obtain a token), for accessing resources from an un-trusted location according to policy configured by an administrator. As noted previously, as a result of having been provided the capability information 103 in a token 108, the resource provider 104 knows that it can immediately terminate the user session, and direct the entity to seek a new token rather than waiting for expiration of the token 108. That is, the entity 102 can be notified, and consume information indicating the reason that the session was terminated. This allows the entity 102 to reauthenticate without waiting for the token 108 to expire, taking a critical error, or combinations thereof.

Figure 4:
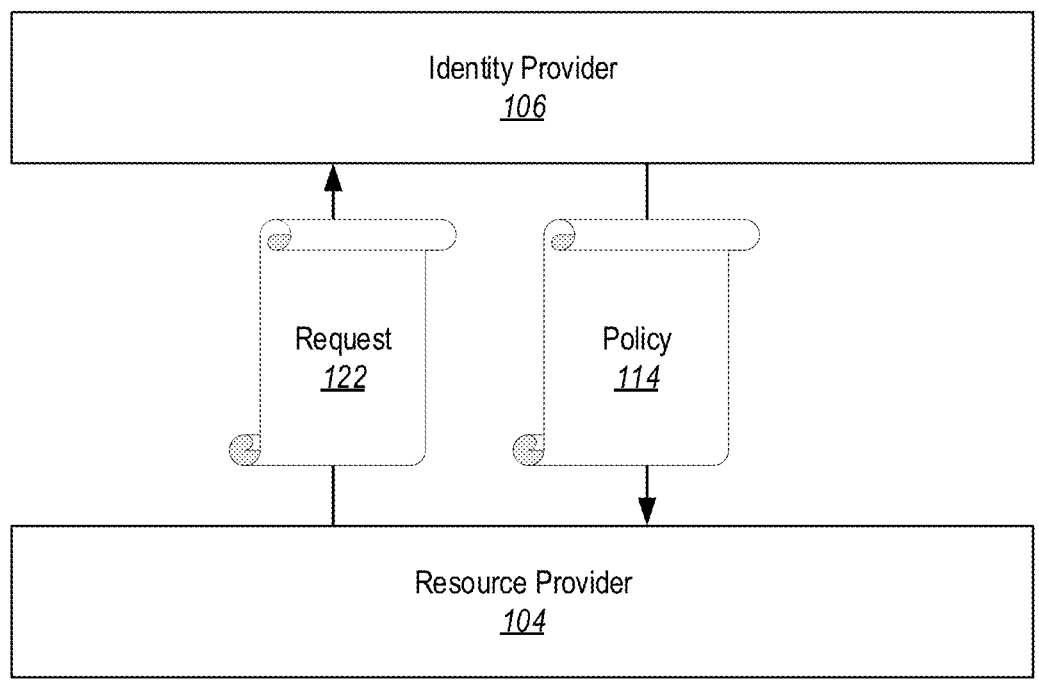
FIG. 4 illustrates one embodiment of an identity provider providing policy to a resource provider.

Referring now to FIG. 4, one embodiment is illustrated. In the example illustrated in FIG. 4, the resource provider 104 can send a request 122 for the policy 114 from the identity provider 106. In response, the identity provider 106 can provide the policy 114 to the resource provider 104, where the resource provider 104 can administer the policy when entities attempt to access resources from the resource provider.

Note that in some embodiments, the policy 114 may be limited in scope. For example, in some embodiments the policy 114 may apply to a particular entity or to a particular group of entities. Alternatively, or additionally, the policy 114 may apply globally to all entities attempting to access resources in a system. Alternatively, or additionally, in some embodiments, the policy 114 is applicable only to certain resource providers or classes of resource providers.

Figure 5:
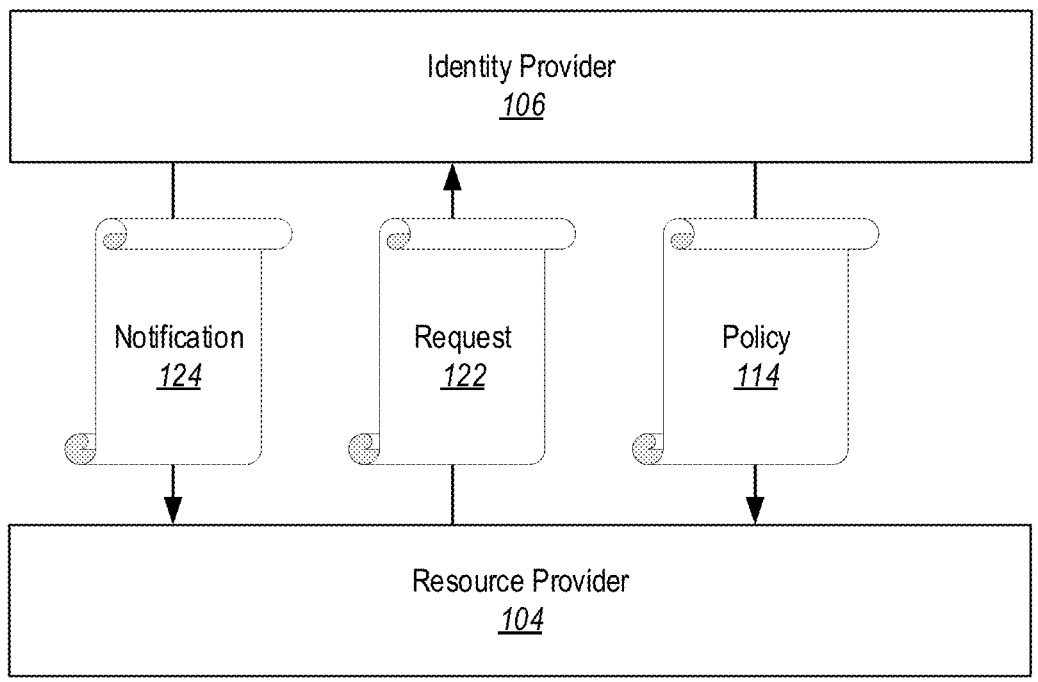
FIG. 5 illustrates one embodiment of an identity provider providing policy to a resource provider.

Referring now to FIG. 5, an alternative embodiment is illustrated. In FIG. 5, the identity provider 106 may be configured to notify the resource provider 104 any time that policy has been updated at the identity provider 106. For example, an administrator may update policy and the identity provider 106 through a policy portal. Once this occurs, the identity provider 106 may automatically send a notification 124 to the resource provider 104 notifying the resource provider that additional policy is available at the identity provider 106. In response, the resource provider 104 sends a request 122 to the identity provider 106 to obtain the policy 114. In response to the request 122, the identity provider 106 provides the policy 114 to the resource provider 104 where the resource provider can then administer the policy as entities attempt to access resources from the resource provider 104.

Figure 6:
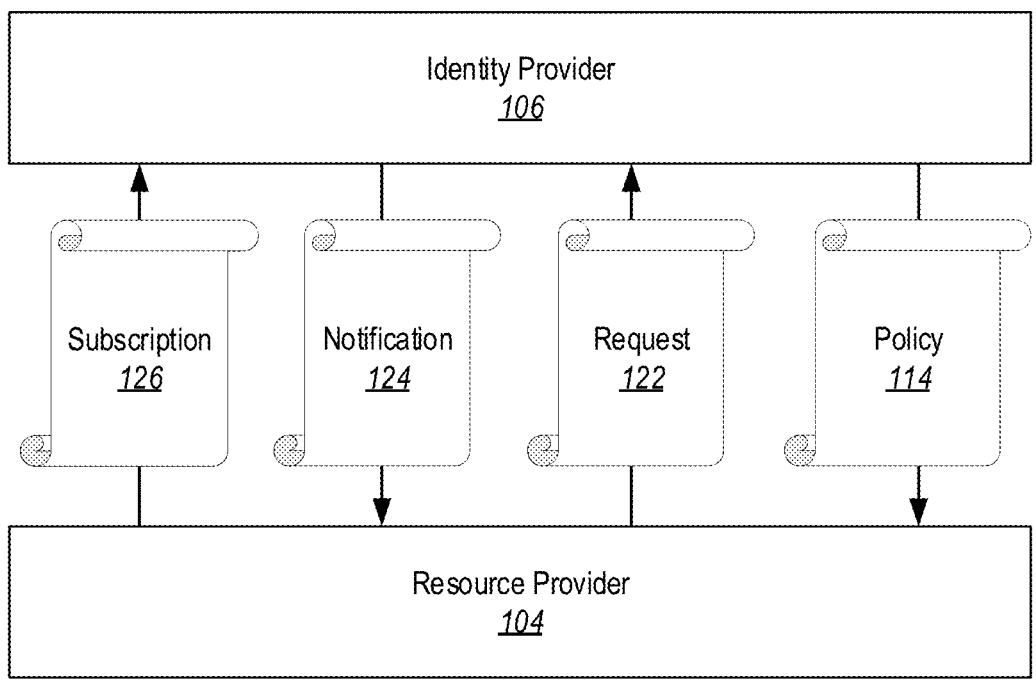
FIG. 6 illustrates one embodiment of an identity provider providing policy to a resource provider.

Referring now to FIG. 6, an alternative embodiment is illustrated. In FIG. 6, a resource provider 104 may subscribe to a subscription service at the identity provider 106 or associated with the identity provider 106. In particular, FIG. 6 illustrates a subscription 126 sent from the resource provider 104 to the identity provider 106. The subscription 126 may be applicable to any one of a number of different items. For example, in some embodiments, the resource provider 102 will subscribe to notifications, policy, or combinations thereof for one or more particular entities identified particularly. Alternatively, or additionally, the resource provider 104 may subscribe to certain classes of entities. Alternatively, or additionally, the resource provider 104 may subscribe to policy changes in general from the identity provider 106. This subscription indicates to the identity provider 106 that the resource provider 104 is to be notified when the policy is updated at the identity provider 106. In the example illustrated in FIG. 6, as a result of the subscription 126, a notification 124 (and other notifications over time) is sent to the resource provider 104. The notification 124 indicates to the resource provider 104 that policy is available at the identity provider 106 for the resource provider 104. In response to the notification 124, the resource provider 104 will send a request 122 to the identity provider 106. In response to the request 122, policy 114 is sent from the identity provider 106 to the resource provider 104, where the resource provider 104 can administer the policy locally when entities attempt to access resources from the resource provider 104.

Figure 7:
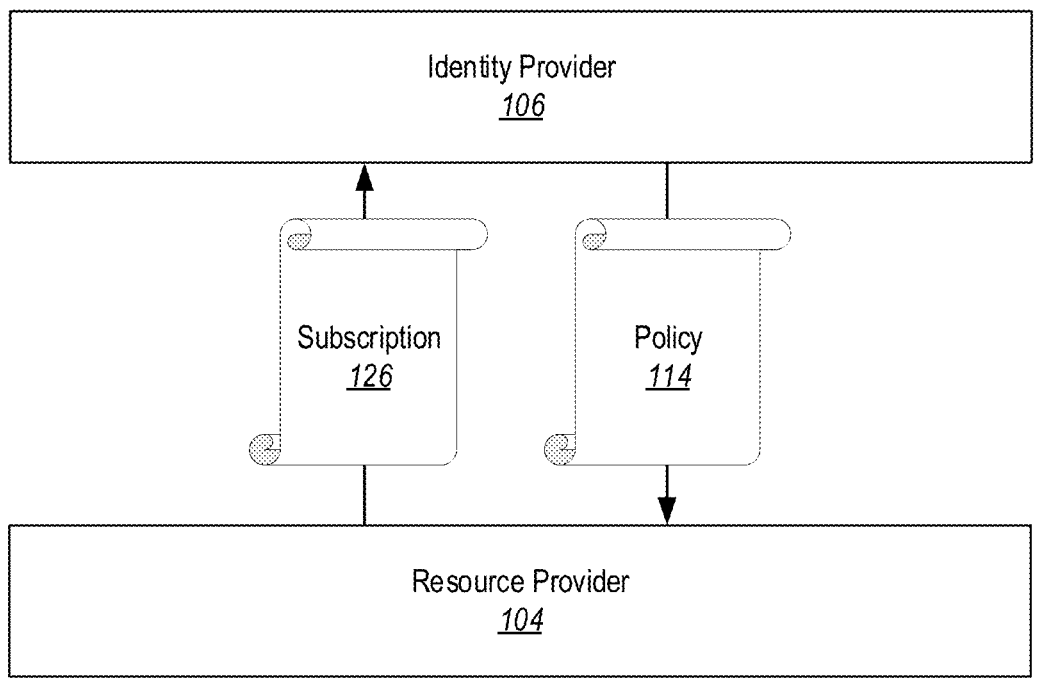
FIG. 7 illustrates one embodiment of an identity provider providing policy to a resource provider.

Referring now to FIG. 7, an alternative or additional embodiment is illustrated. In FIG. 7, the resource provider 104 sends a subscription 126 to the identity provider 106. The identity provider 106 can publish events in the form of the policy 114 when additional policy is available to be sent to the resource provider 104. This can help to reduce network overhead traffic to remove the requirement that specific requests for policy be sent from the resource provider 104 to the identity provider 106.

Figure 8:
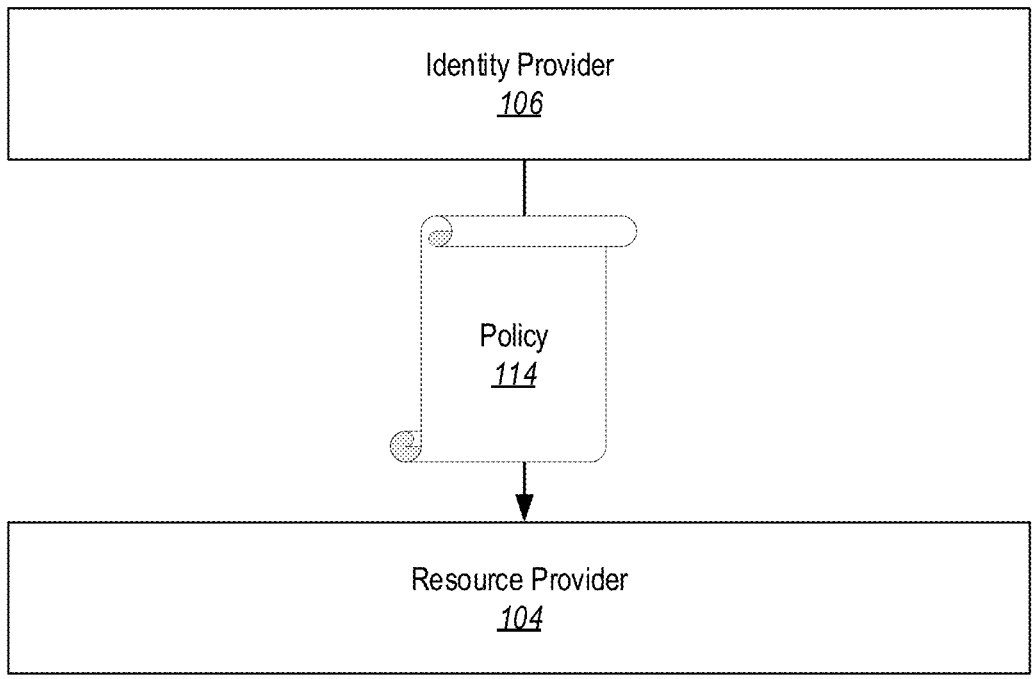
FIG. 8 illustrates one embodiment of an identity provider providing policy to a resource provider.

In yet and even simpler example illustrated in FIG. 8, the identity provider 106 may automatically publish the policy 114 to any applicable resource providers such as the resource provider 104.

Figure 9:
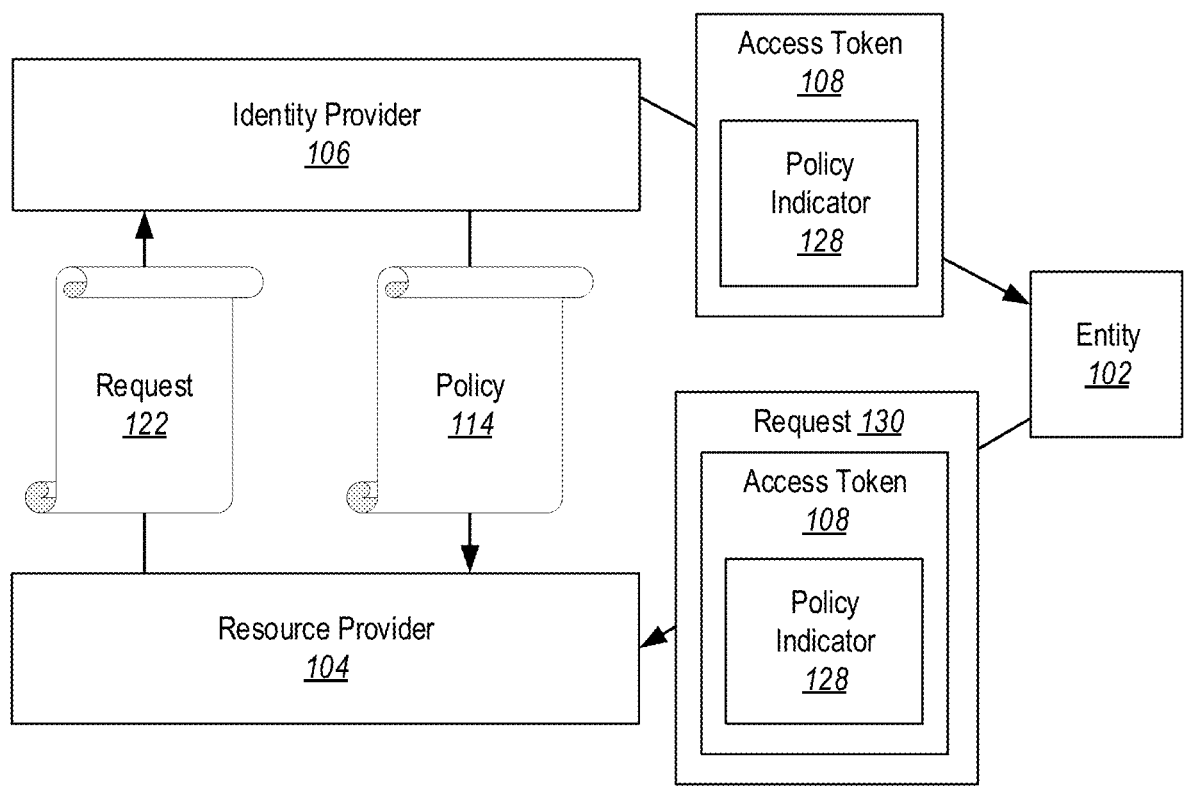
FIG. 9 illustrates one embodiment of an identity provider providing policy to a resource provider.

Referring now to FIG. 9, an alternative or additional embodiment is illustrated. In this example, the entity 102 authenticates with the identity provider 106 to obtain the access token 108. In this particular example, the access token 108 includes a policy indicator 128. The policy indicator 128 includes an indication indicating that policy is available for the entity 102 at the identity provider 106. When the entity 102 requests resources from the resource provider 104 in a request 130, the request 130 will include the access token 108 which includes the policy indicator 128 indicating that policy is available at the identity provider 106 for the entity 102. When the resource provider 104 receives the access token 108 and policy indicator 128, the resource provider 104 can send a request 122 to the identity provider 106. In response to the request 122, the identity provider 106 can provide the policy 114 to the resource provider 104. The resource provider 104 can then administer the policy with respect to the entity 102 as the entity 102 attempts to access the resources 112 provided by the resource provider 104.

The following now illustrates additional details with respect to the types of policy that can be provided to resource providers and administered by the resource providers, and for which an entity can provide capability information 103 indicating that the entity 102 is capable of handling token rejections for these particular polices. As noted previously, embodiments may include location based policy such as policy that identifies the location of an entity 102 attempting to access resources 112 from a resource provider 104. In particular, the policy illustrated above is directed to whether or not the entity 102 is attempting the access from within a corporate intranet or from outside of the corporate intranet. Other location policies may be implemented alternatively, or additionally.

While the example illustrated above is related to policy directed to location, other embodiments may be implemented with other types of policies. For example, in some embodiments, policy may be based on behavioral patterns of users. For example, such behavioral patterns may include typing speed, a usual pattern of typos, intervals between various user inputs, machine usage patterns, application usage patterns, etc. An administrator 120 can configure a policy at the identity provider 106 that indicates that when risk level is increasing due to unexpected user behavioral patterns, that additional authentication is required to access resources. This policy can be provided to the resource provider from the identity provider 106 as illustrated above such that the resource provider 104 can enforce this policy when anomalies are detected in user behavioral patterns. In particular, user behavioral patterns are not easily detected by the identity provider 106 because the identity provider 106 has very limited interaction with the entity 102. That is, the entity 102 performs a limited interaction with the identity provider 106 to obtain an access token 110, and then uses the access token 110 at the resource provider 104 for accessing the resources 112 where a more rich interaction sequence is performed. In this way, the resource provider 104 is more suited to enforce behavioral pattern policy.

However, using the modalities illustrated previously, the policy 114 can nonetheless be configured at the identity provider 106 and subsequently be provided to the resource provider 104 for enforcement directly at the resource provider 104. For example, consider an example where an entity 102 interacts heavily with the resource provider 104. For example, this may occur when an entity uses web-based applications. For example, if an entity is using a web-based email application, web-based word processor, web-based spreadsheet, or even a web-based office suite, user behavioral patterns are readily apparent to the resource provider 104 providing the web-based resources. In particular, the resource provider 104 can readily detect typing speed, typos, switches between applications, or other behavioral patterns. These patterns can be compared with previous patterns exhibited by the entity 102 to detect a significant deviation from previous patterns. When this significant deviation occurs, the resource provider 104 can consult policy 114 provided previously by the identity provider 106 to determine what action should be taken. For example, if the entity 102 has previously authenticated using only single factor authentication, as indicated in an access token 108 provided by the user, and the policy 114 indicates that when a threshold level of variation from user behavioral patterns from previous interactions has occurred, that the session should be terminated, that multi-factor authentication is required, or both. Note that previous interactions may be measured as aggregated and averaged patterns over all time, aggregated and averaged patterns over particular times, a sliding window of patterns, manually configured patterns, combinations thereof, etc. The resource provider 104 can terminate the session and direct the entity 102 back to the identity provider 106 to obtain multi-factor authentication to start a new session with the resource provider 104. Alternatively, the resource provider 104 may be able to determine that the entity 102 already authenticated using multifactor authentication and can continue the session as the current session, in spite of significant changes to behavioral patterns, complies with policy provided by the identity provider 106 to the resource provider 104.

In some embodiments, such as that illustrated in FIG. 9, an access token 108 provided by the identity provider 106 to the entity 102 can include information indicating whether or not policy 114 was configured for the particular entity 102. In particular, not every entity will have a particular type of policy, such as a location policy or behavioral pattern policy or other policy associated with the entity. Thus, some embodiments may include functionality for issuing access tokens with extended information indicating whether or not the policy is configured for the particular entity bearing the token. Thus, for example, if an entity 102 has policy configured for the entity 102 at the identity provider 106, the access token 108 for that entity 102 will indicate that policy exists at the identity provider 106 for the entity 102. Thus, in some examples, when an access token 108 is provided to a resource provider 104 to attempt to obtain access to certain resources 112, the resource provider 104 can inspect the access token 108 and determine that policy exists at the identity provider 106 for the entity 102 presenting the access token 108. In this case, the resource provider 104 can request the policy 114 from the identity provider 106, and can then enforce the policy 114 at the resource provider 104 for the entity 102 providing the access token 108.

Figure 10A:
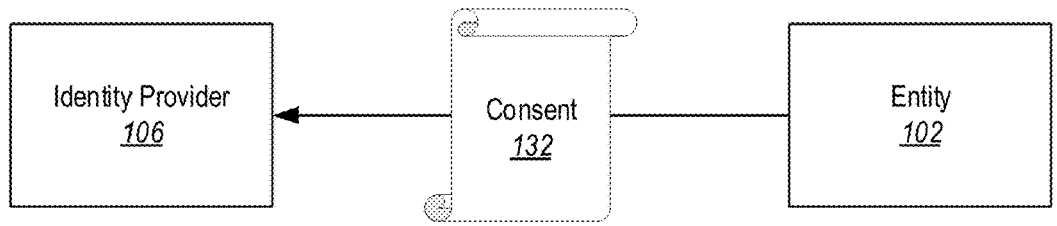
FIGS. 10A-10D illustrates various ways of consent being given for policy to be provided on behalf of an entity.

Some embodiments may be implemented where entities provide consent for associated policy related to the entities being issued to resource providers. As illustrated in FIG. 10A, in some embodiments consent may be provided directly by the entity 102 providing consent 132 directly to the identity provider 106. For example, the entity 118 could send a message to the identity provider 106 indicating which service providers have consent to subscribe to the identity provider 106 with respect to the entity 102.

Figure 10B:
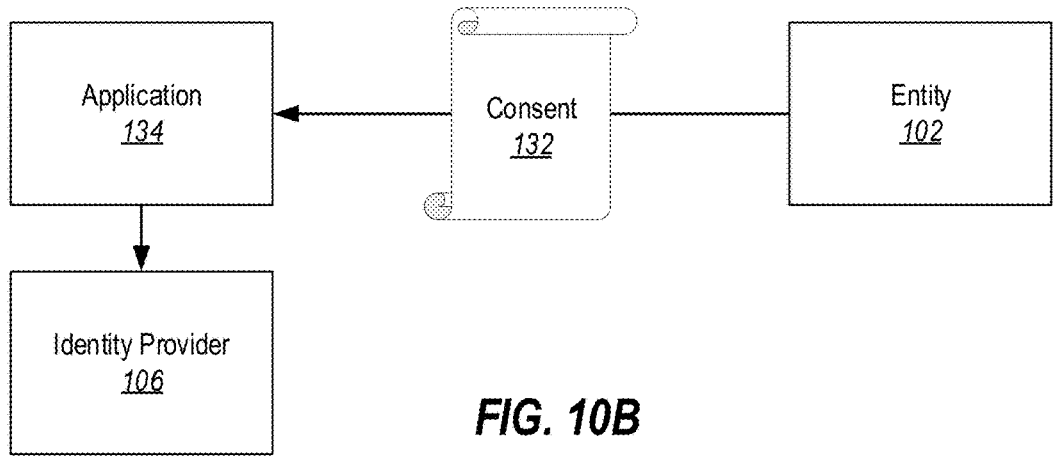

Alternatively or additionally, As illustrated in FIG. 10B, the entity may provide consent 132 to an application 134, and the application 134 may notify the identity provider 106 that the consent is provided. For example, in some embodiments, the application 134 may include a user interface that allows a user to provide the consent as part of the configuration of the application 134.

Figure 10C:
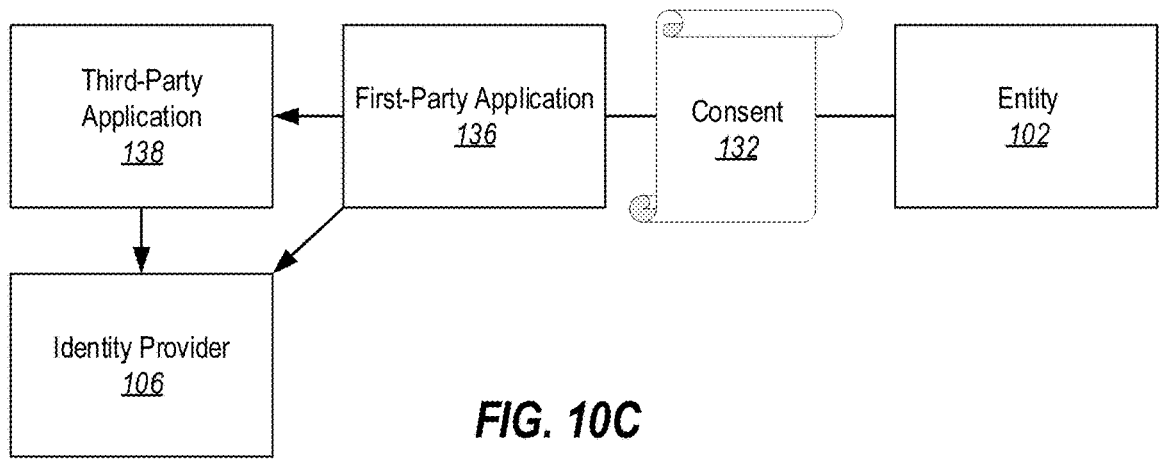

Alternatively or additionally, as illustrated in FIG. 10C, the consent 132 may be provided by the entity 102 consenting to a first-party application 136 for a different third-party application 138. For example, a user may use their Contoso (a fictional company used for illustration herein) credentials, in a single sign-on scenario, which can be used to authenticate to a third-party application not directly controlled by Contoso. The entity will consent to a first-party Contoso application for the third-party application, thus allowing subscriptions for the entity for the third-party application. For example, FIG. 10C illustrates that the consent 132 can be provided to the first-party application 136. The first-party application 136 can notify the third-party application 138 of the consent (which can then notify the identity provider 106 of the consent 132) or can notify the identity provider 106 directly of the consent 132.

Figure 10D:
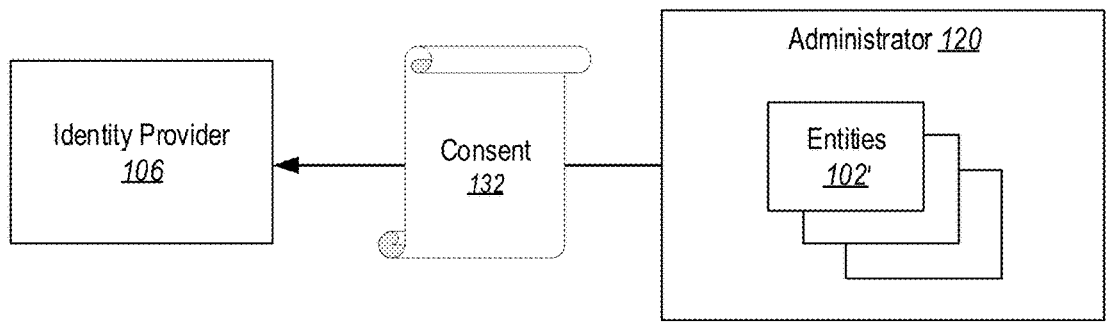

In some embodiments, as illustrated in FIG. 10D, consent may be provided by an administrator 120 for a group of entities including the entity. In the example illustrated in FIG. 10D, the administrator 120 provides consent 132' to the identity provider 106 on behalf of a set 102' of entities over which the administrator 120 has control. While the example illustrated in FIG. 10D shows consent provided directly to the identity provider 106, it should be appreciated that in other embodiments, the consent may be provided to applications such as is illustrated in FIGS. 9B and 9C, or other entities.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 11:
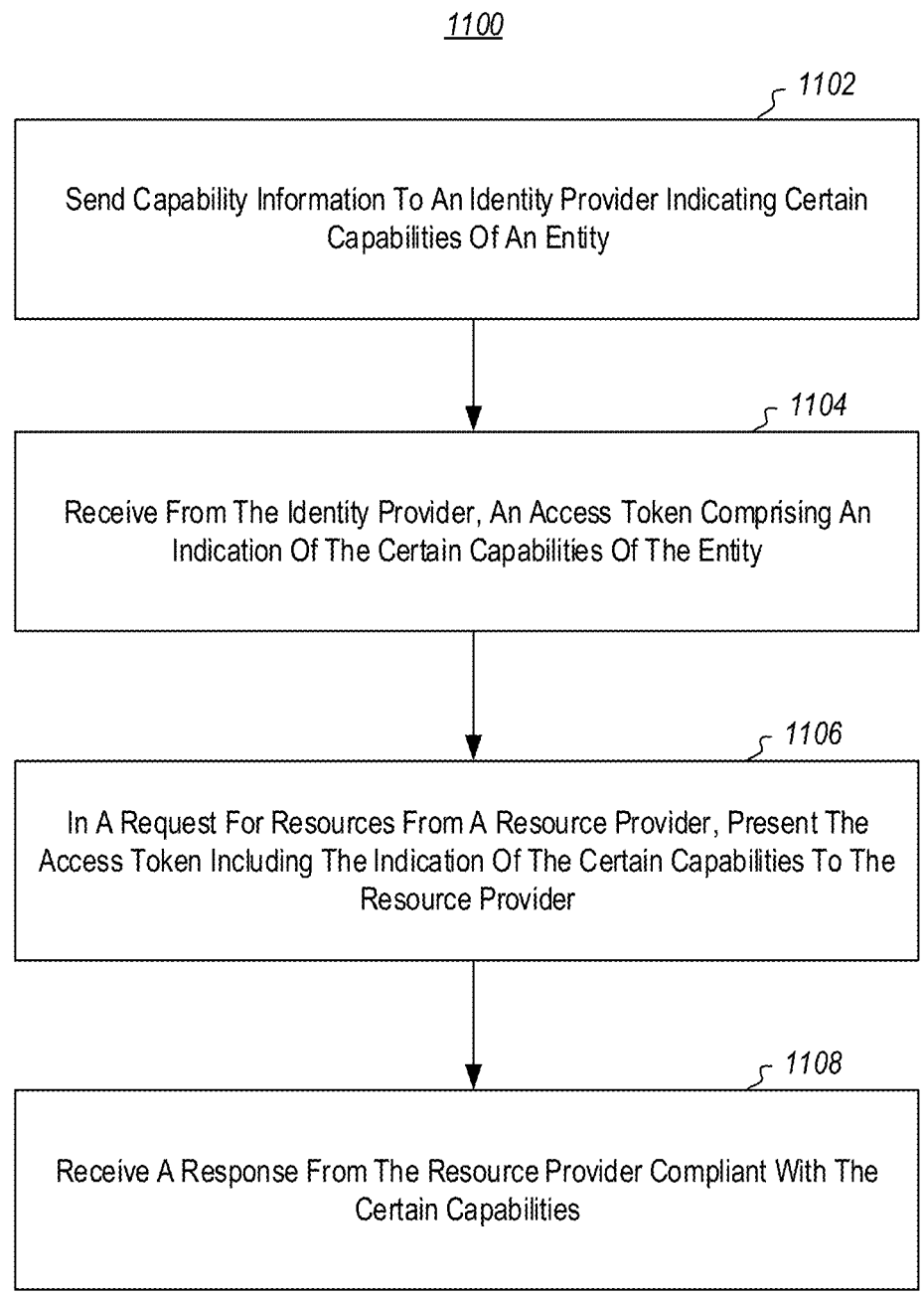
FIG. 11 illustrates a method of authenticating an entity.

Referring now to FIG. 11, a method 1100 is illustrated. The method 1100 includes acts for authenticating an entity with certain capabilities. The method includes sending capability information to an identity provider indicating the certain capabilities of the entity (act 1102).

The method 1100 further includes, as a result, receiving from the identity provider, an access token comprising an indication of the certain capabilities of the entity (act 1104).

The method 1100 further includes, in a request for resources from a resource provider, presenting the access token including the indication of the certain capabilities to the resource provider (act 1106).

The method 1100 further includes, as a result, receiving a response from the resource provider compliant with the certain capabilities (act 1108).

The method 1100 may be practiced where the response comprises resources compliant with the certain capabilities.

The method 1100 may be practiced where the capability information indicates that the entity is capable of handling certain types of access token rejections.

The method 1100 may be practiced where the capability information indicates that the entity is capable of handling access token rejections indicating rejections for least one of user state changes, client state changes, policy state changes, conditional access conditions being met, location of the entity, or behavior patterns by the entity.

The method 1100 may be practiced where the response comprises access token rejections according to the certain capabilities.

The method 1100 may further include receiving an access token rejection according the certain capabilities. In this example, the access token rejection includes response information. The method, in this example, further includes using the response information, requesting a new access token from the identity provider. In this example, the method further includes, receiving the new access token from the identity provider. In this example, the method further includes using the new access token to obtain the resources from the resource provider.

The method 1100 may further include receiving an access token rejection according the certain capabilities. In this example, the access token rejection includes response information. In some such embodiments, the method may further include consuming the response information. Consuming includes, for example, reading and acting on the response information, such as by executing programmatic actions in response to reading the information.

Figure 12:
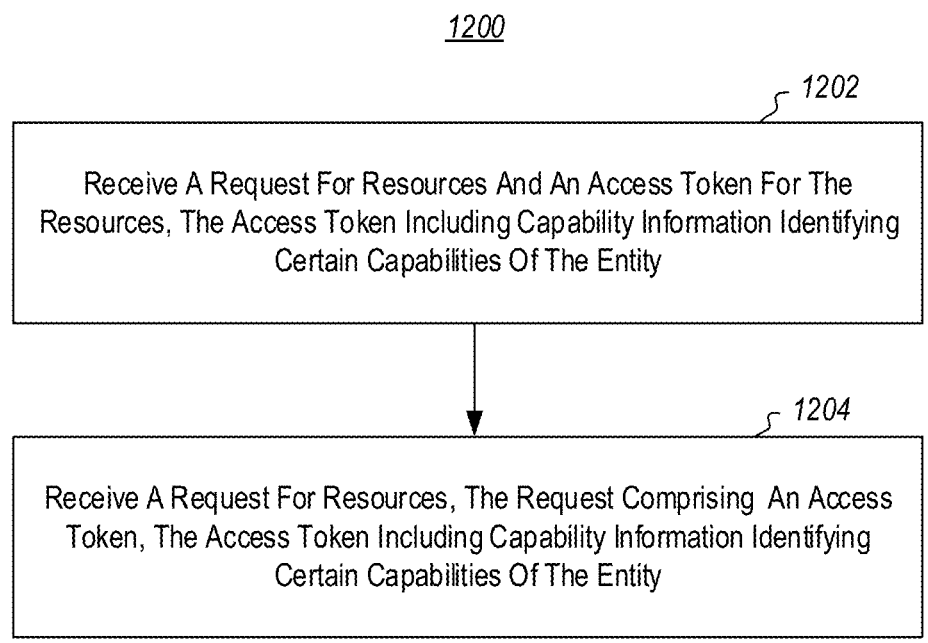
FIG. 12 illustrates a method of communicating with an entity with certain capabilities.

Referring now to FIG. 12, another method 1200 is illustrated. The method includes acts for communicating with an entity with certain capabilities. The method 1100 includes at a resource provider computer system, receiving a request for resources the request including an access token (act 1202). The access token includes capability information identifying the certain capabilities of the entity. The access token was previously obtained by the entity from an identity provider as a result of the entity authenticating with the identity provider and providing the capability information to the identity provider.

The method 1200 further includes, at the resource provider, providing a response to the request compliant with the certain capabilities (act 1204).

The method 1200 may be practiced where the response comprises resources compliant with the certain capabilities.

The method 1200 may be practiced where the capability information indicates that the entity is capable of handling certain types of access token rejections.

The method 1200 may be practiced where the capability information indicates that the entity is capable of handling access token rejections indicating rejections for least one of user state changes, client state changes, policy state changes, conditional access conditions being met, location of the entity, or behavior patterns by the entity.

The method 1200 may be practiced where the response comprises access token rejections according to the certain capabilities.

The method 1200 may further include sending an access token rejection according the certain capabilities. In this example, the access token rejection includes response information. Such embodiments may further include receiving a new request for the resources and a new access token having been obtained by the entity from the identity provider using the response information. These embodiments may further include, as a result of receiving the new access token, providing the resources.

Figure 13:
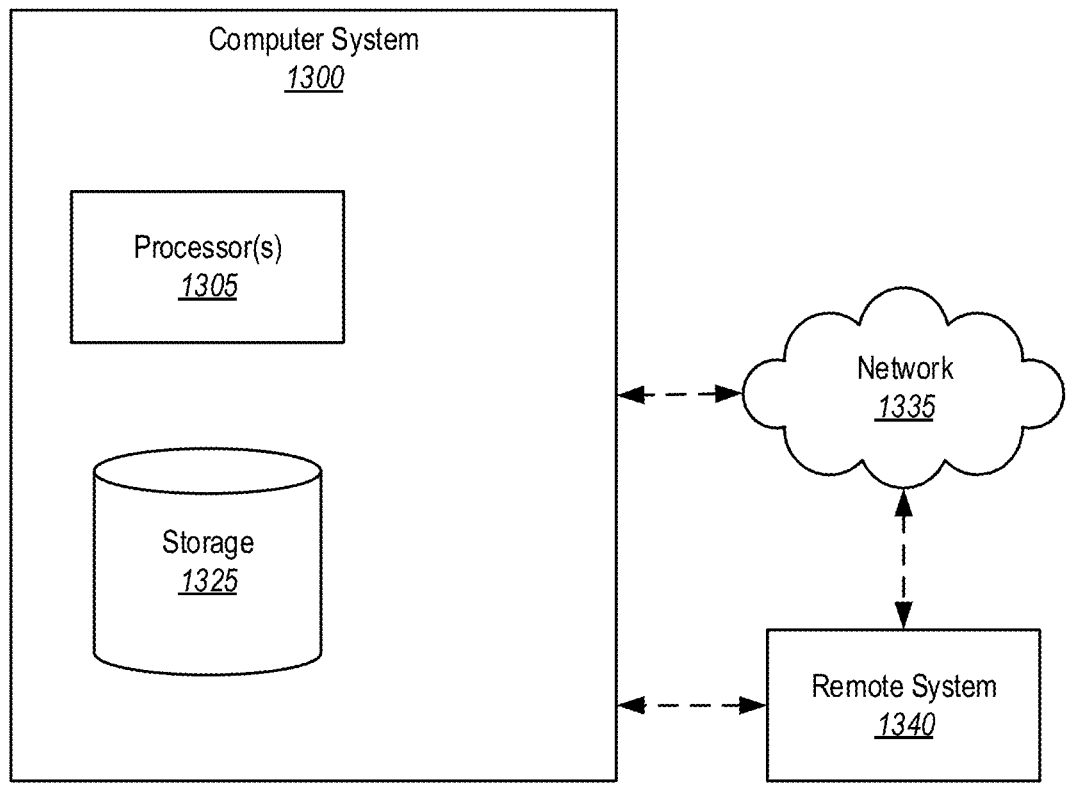
FIG. 13 illustrates a computing system where embodiments may be practiced.

Having just described the various features and functionalities of some of the disclosed embodiments, attention is now directed to FIG. 13, which illustrates an example computer system 1300 that may be used to facilitate the operations described herein. Computer systems, such as system 1300 may be used to implement any of the computer systems described above.

The methods may be practiced by a computer system 1300 including one or more processors 1305 and computer-readable storage 1325 such as computer memory. In particular, the computer memory may store computer-executable instructions that when executed by one or more processors 1305 cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media, such as the storage 1325, for carrying or storing computer-executable instructions, data structures, or combinations thereof. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" (e.g., network 1335) is defined as one or more data links that enable the transport of electronic data between computer systems, modules, other electronic devices, or combinations thereof. When information is transferred or provided over a network or another communications connection (either hardwired, wireless, or a combination of hardwired or wireless) to a computer (e.g., remote system 1340), the computer properly views the connection as a transmission medium. Transmissions media can include a network, or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM, to less volatile computer-readable physical storage media at a computer system, or combinations thereof. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features, methodological acts, or combinations thereof, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   an identity provider computer system comprising at least one processor configured to receive requests for access tokens from entities, the requests comprising capability information for the entities, wherein the capability information indicates that the entity is capable of handling certain types of access token rejections by at least requesting a new token, prior to expiration of the token, based on the rejection from the resource provider, and further wherein the identity provider computer system is further configured to provide access tokens to the entities which include the capability information for the entities, and further wherein the identity provider computer system is further configured to issue new access tokens to the entities upon receiving a request for a new access token from the entities, subsequent to the entities receiving an access token rejection, prior to expiration of the token, according to the capability information for the entities; and a resource provider computer system comprising at least one processor configured to receive resource requests and access tokens from the entities, the access tokens including the capability information for the entities, and to provide responses to the entities according to the capability information for the entities, wherein the resource provider is further configured to issue access token rejections according to the capability information for the entities and containing response information for requesting a new access token from the identity provider.

2. The computing system of claim 1, wherein the responses comprise resources compliant with the capability information.

3. The computing system of claim 1, wherein the capability information indicates that the entity is capable of handling access token rejections for least one of user state changes, client state changes, policy state changes, conditional access conditions being met, location of the entity, or behavior patterns by the entity.

4. The computing system of claim 1, wherein the responses comprise access token rejections according to the certain capabilities.

5. The computing system of claim 1, wherein the resource provider computer system is further configured to receive policy from the identity provider computer system.

6. The computing system of claim 5, wherein the policy is correlated to the capability information, and wherein the resource provider computer system is configured to receive the policy as a result of the identity provider receiving the capability information from the entity.

7. A method of authenticating an entity with certain capabilities, the method comprising:

sending capability information to an identity provider computer system, indicating the certain capabilities of the entity, wherein the capability information indicates that the entity is capable of handling certain types of access token rejections by at least requesting a new token, prior to expiration of the token, based on the rejection from the resource provider;

as a result, receiving from the identity provider computer system, an access token comprising an indication of the certain capabilities of the entity;

in a request for resources from a resource provider computer system, presenting the access token including the indication of the certain capabilities of the entity to the resource provider computer system;

receiving an access token rejection according to the certain capabilities, the access token rejection comprising response information;

using the response information, requesting a new access token from the identity provider computer system;

receiving the new access token from the identity provider computer system; and using the new access token to obtain the resources from the resource provider computer system.

8. The method of claim 7, wherein the response comprises resources compliant with the certain capabilities.

9. The method of claim 7, wherein the capability information indicates that the entity is capable of handling access token rejections indicating rejections for least one of user state changes, client state changes, policy state changes, conditional access conditions being met, location of the entity, or behavior patterns by the entity.

10. The method of claim 7, wherein the response comprises access token rejections according to the certain capabilities.

11. The method of claim 7, further comprising:

receiving an access token rejection according the certain capabilities, the access token rejection comprising response information;

using the response information, requesting a new access token from the identity provider computer system;

receiving the new access token from the identity provider computer system; and using the new access token to obtain the resources from the resource provider computer system.

12. The method of claim 7, further comprising:

receiving an access token rejection according the certain capabilities, the access token rejection comprising response information; and consuming the response information.

13. A method of communicating with an entity with certain capabilities, the method comprising:

at a resource provider computer system, receiving a request for resources from the entity, the request comprising an access token, the access token including capability information identifying the certain capabilities of the entity, wherein the capability information indicates that the entity is capable of handling certain types of access token rejections by at least requesting a new token, prior to expiration of the token, based on the rejection from the resource provider, and further wherein the access token has been previously obtained by the entity from an identity provider computer system, as a result of the entity interfacing with the identity provider, and authenticating with the identity provider computer system and providing the capability information to the identity provider computer system;

sending an access token rejection according the certain capabilities, the access token rejection comprising response information;

receiving a new request for the resources and a new access token having been obtained by the entity from the identity provider using the response information; and as a result of receiving the new access token, providing the resources.

14. The method of claim 13, wherein the response comprises resources compliant with the certain capabilities.

15. The method of claim 13, wherein the capability information indicates that the entity is capable of handling access token rejections indicating rejections for least one of user state changes, client state changes, policy state changes, conditional access conditions being met, location of the entity, or behavior patterns by the entity.

16. The method of claim 13, wherein the response comprises access token rejections according to the certain capabilities.

17. The method of claim 13, further comprising:
sending an access token rejection according the certain capabilities, the access token rejection comprising response information;
receiving a new request for the resources and a new access token having been obtained by the entity from the identity provider using the response information; and
as a result of receiving the new access token, providing the resources.

* * * * *